United States Patent
Knott

(10) Patent No.: US 11,389,964 B2
(45) Date of Patent: Jul. 19, 2022

(54) ACTIVELY DAMPED ROBOT

(71) Applicant: BAE Systems plc, London (GB)

(72) Inventor: Martin Knott, Balderstone (GB)

(73) Assignee: BAE Systems plc, London (GB)

(*) Notice: Subject to any disclaimer, the term of this patent is extended or adjusted under 35 U.S.C. 154(b) by 121 days.

(21) Appl. No.: 16/963,952

(22) PCT Filed: Feb. 19, 2019

(86) PCT No.: PCT/GB2019/050432
§ 371 (c)(1),
(2) Date: Jul. 22, 2020

(87) PCT Pub. No.: WO2019/162653
PCT Pub. Date: Aug. 29, 2019

(65) Prior Publication Data
US 2021/0046654 A1    Feb. 18, 2021

(30) Foreign Application Priority Data

Feb. 21, 2018  (EP) ...................................... 18157901
Feb. 21, 2018  (GB) ...................................... 1802796

(51) Int. Cl.
*B25J 9/16*    (2006.01)
*B25J 9/04*    (2006.01)
(Continued)

(52) U.S. Cl.
CPC .............. *B25J 9/1694* (2013.01); *B25J 9/04* (2013.01); *B25J 9/126* (2013.01); *B25J 11/0055* (2013.01);
(Continued)

(58) Field of Classification Search
CPC ... B25J 9/04; B25J 9/126; B25J 9/1602; B25J 9/1694; B25J 11/0055; B25J 13/087;
(Continued)

(56) References Cited

U.S. PATENT DOCUMENTS 5,086,564 A    2/1992  Schalz
2008/0277953 A1   11/2008  Condliff
(Continued)

FOREIGN PATENT DOCUMENTS

CN    206998973 U    2/2018
DE    102018001505 A1    8/2018
(Continued)

OTHER PUBLICATIONS

International Preliminary Report on Patentability for PCT Appl. No. PCT/GB2019/050432, dated Aug. 27, 2020, 9 Pages.
(Continued)

*Primary Examiner* — Dale Moyer
(74) *Attorney, Agent, or Firm* — Maine Cernota & Rardin

(57) ABSTRACT

A robotic system comprising: a multi-axis robot; one or more sensors located on the multi-axis robot; a damping system configured to apply a resistive force to the multi-axis robot, thereby to resist movement of the multi-axis robot; and a controller coupled to the one or more sensors and the damping system, the controller being configured to: receive sensor measurements from the one or more sensors; and control, based on the received sensor measurements, the damping system thereby to control the resistive force applied by the damping system to the multi-axis robot.

15 Claims, 2 Drawing Sheets

(51) Int. Cl.
    *B25J 9/12*     (2006.01)
    *B25J 11/00*     (2006.01)
    *B25J 13/08*     (2006.01)
    *B25J 15/00*     (2006.01)
    *B25J 19/00*     (2006.01)

(52) U.S. Cl.
    CPC ......... *B25J 13/087* (2013.01); *B25J 15/0019* (2013.01); *B25J 19/0012* (2013.01)

(58) Field of Classification Search
    CPC . B25J 15/0019; B25J 19/0012; G05B 19/404; G05B 2219/37619; G05B 2219/49048; G05B 2219/49054; G05D 19/00
    See application file for complete search history.

(56) References Cited

U.S. PATENT DOCUMENTS

| | | | |
|---|---|---|---|
| 2016/0076263 A1* | 3/2016 | Tebeek | E04G 21/0454 701/50 |
| 2016/0116017 A1 | 4/2016 | Ebihara | |
| 2016/0318151 A1* | 11/2016 | Kitahata | B24B 41/06 |
| 2017/0014997 A1 | 1/2017 | Rohmer | |
| 2017/0151664 A1 | 6/2017 | Makino et al. | |
| 2018/0164170 A1* | 6/2018 | Nakata | G01L 3/24 |
| 2019/0143511 A1* | 5/2019 | Kai | B25J 11/005 700/254 |
| 2019/0302705 A1* | 10/2019 | Ito | G05B 19/18 |

FOREIGN PATENT DOCUMENTS

| | | |
|---|---|---|
| EP | 1001184 A2 | 5/2000 |
| JP | 6262583 A | 9/1994 |
| JP | 2003071767 A | 3/2003 |
| JP | 2005103649 A | 4/2005 |
| WO | 8103518 A1 | 12/1981 |
| WO | 2013184456 A1 | 12/2013 |

OTHER PUBLICATIONS

Search Report for European Patent Appl. No. 181579012, dated Aug. 8, 2018, 8 Pages.

Search Report for Great Britain Patent Appl. No. 1802796.1, dated Aug. 8, 2018, 3 Pages.

Combined Search and Examination Report for Great Britain Patent Appl. No. 1902243.3, dated Aug. 6, 2019, 8 Pages.

International Search Report and Written Opinion for PCT Appl. No. PCT/GB2019/050432, dated Apr. 25, 2019, 15 Pages.

\* cited by examiner

ACTIVELY DAMPED ROBOT

RELATED APPLICATIONS

This application is a national phase application filed under 35 USC § 371 of PCT Application No. PCT/GB2019/050432 with an International filing date of Feb. 19, 2019, which claims priority of EP Patent Application 18157901.2 filed Feb. 21, 2018 and GB Patent Application 1802796.1 filed Feb. 21, 2018. Each of these applications is herein incorporated by reference in its entirety for all purposes.

FIELD OF THE INVENTION

The present invention relates to robotic systems, and more particularly to the damping of vibration, deflection, and the like in robotic systems.

BACKGROUND

In the field of aircraft construction, high accuracy is required for certain manufacturing processes including drilling, machining, and fastening functions.

Multi-axis robots, which are also referred to as robot arms, having end effectors, such as machining or drilling tools, may be used to perform many manufacturing processes. It tends to be possible to control a multi-axis robot to position its end effector with a high degree of repeatability and accuracy, e.g., by augmenting the robot with additional sensors.

FIG. 1 is a schematic illustration (not to scale) showing an example conventional manufacturing robot, or robot arm, 100.

In this example, the robot 100 comprises six arm portions, namely a first portion 111, a second portion 112, a third portion 113, a fourth portion 114, a fifth portion 115, and sixth portion 116. The robot 100 includes a first rotary axis 121, a second rotary axis 122, a third rotary axis 123, a fourth rotary axis 124, a fifth rotary axis 125, and a sixth rotary axis 126. The robot 100 further comprises a first motor 131, a second motor 132, a third motor 133, a fourth motor 134, a fifth motor 135, and a sixth motor 136, which separately operate a respective axis 121-126, i.e. the first motor 131 controls rotation about the first axis 121, the second motor 132 controls rotation about the second axis 122, and so on.

The operation of the individual axes 121-126 allows the robot's end effector 140 to be repeatably and accurately positioned with respect to a workpiece. Roll, pitch and yaw of the end effector 140 also tend to be controllable.

The robot 100 is controlled by a controller (not shown in FIG. 1). More specifically, a controller controls operation of the motors 131-136 to move the robot 100. Also, the controller controls the end effector 140.

In this example, a counterbalance 142 is coupled between the second and third portions 112, 113. The counterbalance 142 may, for example, be a hydraulic damper or a gas spring. The counterbalance 142 comprises a piston operating within a cylinder containing a pressurized fluid, i.e. a liquid or gas.

The counterbalance 142 acts to support the weight of the robot 100 in operation, thereby to improve control of the robot 100.

SUMMARY OF THE INVENTION

The present inventors have realised that the mechanical structures of conventional manufacturing robots, such as the robot 100, tend to vibrate during some machining operations, for example those involved in the construction of aircraft. Such vibrations can detrimentally affect end part surface quality and robot integrity, causing premature wear or even breaking of the cutting tool and reducing the service life of the robot.

The present inventors have further realised that passive counterbalances, such as that shown in FIG. 1, tend to be insufficient in damping/controlling unwanted vibrations of the robot caused by dynamic machining forces experienced, for example during machining operations involved in the construction of aircraft. In other words, passive counterbalances tend to be ineffective when the dynamic parameters of the robot vary. Passive counterbalances tend to be particularly ineffective in robot machining applications in which high accuracy is desirable and when the robot is being used to machine a hard, solid surface.

The present inventors have further realised that active damping may be used to damp unwanted vibrations and reaction against dynamic forces of the robot caused by dynamic machining forces in lieu of or in addition to a passive counterbalance unit.

In a first aspect, the present invention provides a robotic system comprising: a multi-axis robot arm, the robot arm comprising a plurality of arm portions rotatably connected together, the robot arm configured to be rotated about a plurality of rotary axes; one or more sensors located on the robot arm; a damping system configured to apply a resistive force to the robot arm, thereby to resist movement of the robot arm; and a controller coupled to the one or more sensors and the damping system. The controller is configured to: receive sensor measurements from the one or more sensors; and control, based on the received sensor measurements, the damping system thereby to control the resistive force applied by the damping system to the robot arm. The one or more sensors comprise one or more sensors selected from the group of sensors consisting of: a vibration sensor located on the robot arm at or proximate to (e.g. within a threshold distance of) a rotary axis of the robot arm; a strain gauge located on an arm portion remote from the rotary axes; and a temperature sensor located on the robot arm at or proximate to (e.g. within a threshold distance of) a motor of the robot arm, the motor being configured to move the robot arm.

The one or more sensors may comprise all of the vibration sensor, the strain gauge, and the temperature sensor. Advantageously, this synergistic combination of sensors comprising the vibration sensor, the strain gauge, and the temperature sensor tends to provide a more complete picture of the state of the robotic system, e.g. an improved picture of the most relevant or important errors or symptoms of errors in the system. This tends to allow for more effective compensation of errors in the system, such as undesirable movement of the robot arm. Also, the combination of sensors tends to more effectively reduce the likelihood of damage to the robot arm. Furthermore, the combination of sensors tends to provide for improved locating of the sources of errors in the system. For example, the sources or origins of errors in the system tend to be pinpointed more effectively.

The one or more sensors may comprise a plurality of vibration sensors. For each rotary axis of the robot arm, one or more of the vibration sensors may be located on the robot arm at or proximate to that rotary axis. Use of a plurality of vibration sensors tends to provide for improved locating of the sources or origins of errors in the system.

The one or more sensors may comprise a plurality of strain gauges. For each arm portion, one or more of the strain gauges may be located on that arm portion remotely from the axes of the robot arm. Use of a plurality of strain gauges tends to provide for improved locating of the sources or origins of errors in the system.

The robotic system may further comprise a plurality of motors operable to move the robot arm. The one or more sensors may comprise a plurality of temperature sensors. For each motor, one or more of the temperature sensors may be located at or proximate that motor. Use of a plurality of temperature sensors tends to provide for improved locating of the sources or origins of errors in the system.

The damping system may comprise a hydraulic damper or gas spring.

The robotic system may further comprise a pump for pumping a fluid to the damping system, wherein the controller is configured to control, based on the received sensor measurements, the pump to pump the fluid to the damping system thereby to vary the resistive force applied by the damping system to the robot arm. The one or more sensors may further comprise one or more sensors selected from the group consisting of: a first pressure sensor configured to measure a pressure of the fluid in a chamber of the damping system; a second pressure sensor configured to measure a pressure of the fluid in a fluid line of the damping system; and a flow rate sensor configured to measure a flow rate of the fluid in a fluid line of the damping system.

The robotic system may comprise one or more motors operable to move the robot arm, and the controller is configured to control, based on the received sensor measurements, operation of the one or more motors.

The robotic system may further comprise an end effector connected to the robot arm, the end effector comprising a cutting tool. The controller may be configured to control the damping system to actively damp vibration of the end effector.

The robot arm may have six rotary axes.

The robotic system may be an aerospace component manufacturing system.

The one or more sensors may further comprise one or more sensors for measuring amp draw of a motor of the robot arm, the motor being configured to move the robot arm.

In a further aspect, the present invention provides a method of damping a multi-axis robot arm, the robot arm comprising a plurality of arm portions rotatably connected together, the robot arm configured to be rotated about a plurality of rotary axes, the method comprising: measuring, by one or more sensors, one or more parameters of the robot arm; and controlling, by a controller, based on sensor measurements taken by the one or more sensors, a damping system coupled to the robot arm thereby to control a resistive force applied to the robot arm by the damping system. The one or more sensors comprise one or more sensors selected from the group of sensors consisting of: a vibration sensor located on the robot arm at or proximate to a rotary axis of the robot arm, the vibration sensor measuring a vibration of the robot arm; a strain gauge located on an arm portion remote from the rotary axes, the strain gauge measuring a strain in that arm portion; and a temperature sensor located on the robot arm at or proximate to a motor of the robot arm, the motor being configured to move the robot arm, the temperature sensor measuring a temperature at or proximate to the motor.

The controlling may comprise determining, by the controller, based on the sensor measurements, a resistive force to be applied to the robot arm by the damping system, and controlling, by the controller, the damping system to apply the determined resistive force to the robot arm.

In a further aspect, the present invention provides a method of machining a workpiece to produce an aerospace component, the method comprising: controlling a multi-axis robot arm to move an end effector of the robot into contact with the workpiece and to machine the workpiece, the robot arm comprising a plurality of arm portions rotatably connected together, the robot arm configured to be rotated about a plurality of rotary axes; during the machining of the workpiece, measuring, by one or more sensors, one or more parameters of the robot arm; and controlling, by a controller, using sensor measurements of the one or more sensors, a damping system coupled to the robot arm, thereby to control a resistive force applied to the robot arm by the damping system so as to actively damp vibration of the end effector during the machining of the workpiece. The one or more sensors comprise one or more sensors selected from the group of sensors consisting of: a vibration sensor located on the robot arm at or proximate to a rotary axis of the robot arm, the vibration sensor measuring a vibration of the robot arm; a strain gauge located on an arm portion remote from the rotary axes, the strain gauge measuring a strain in that arm portion; and a temperature sensor located on the robot arm at or proximate to a motor of the robot arm, the motor being configured to move the robot arm, the temperature sensor measuring a temperature at or proximate to the motor.

In a further aspect, the present invention provides a robotic system comprising: a multi-axis robot; one or more sensors located on the multi-axis robot; a damping system configured to apply a resistive force to the multi-axis robot, thereby to resist movement of the multi-axis robot; and a controller coupled to the one or more sensors and the damping system. The controller is configured to: receive sensor measurements from the one or more sensors; and control, based on the received sensor measurements, the damping system thereby to control the resistive force applied by the damping system to the multi-axis robot.

The one or more sensors may comprise one or more sensors selected from the group of sensors consisting of: vibration sensors, strain gauges, and temperature sensors. The one or more sensors may comprise one or more vibration sensors located proximate to one or more axes of the multi-axis robot. The one or more sensors may comprise one or more strain gauges located remotely from the axes of the multi-axis robot.

The robotic system may further comprise one or more motors operable to move the multi-axis robot, and the one or more sensors comprise one or more temperature sensors located proximate to the one or more motors.

The damping system may comprise a hydraulic damper or gas spring.

The robotic system may comprise a pump for pumping a fluid to the damping system. The controller may be configured to control, based on the received sensor measurements, the pump to pump the fluid to the damping system thereby to vary the resistive force applied by the damping system to the multi-axis robot.

The robotic system may comprise one or more motors operable to move the multi-axis robot. The controller may be configured to control, based on the received sensor measurements, operation of the one or more motors.

The robotic system may comprise an end effector connected to the multi-axis robot. The end effector may comprise a cutting tool. The controller may be configured to control the damping system to actively damp vibration of the end effector.

The multi-axis robot may have six rotary axes. The robotic system may be an aerospace component manufacturing system.

In a further aspect, the present invention provides a method of damping a multi-axis robot. The method comprising: measuring, by one or more sensors located on the multi-axis robot, one or more parameters of the multi-axis robot; and controlling, by a controller, based on sensor measurements taken by the one or more sensors, a damping system coupled to the multi-axis robot thereby to control a resistive force applied to the multi-axis robot by the damping system.

The controlling may comprise determining, by the controller, based on the sensor measurements, a resistive force to be applied to the multi-axis robot by the damping system, and controlling, by the controller, the damping system to apply the determined resistive force to the multi-axis robot.

In a further aspect, the present invention provides a method of machining a workpiece to produce an aerospace component. The method comprises: controlling a multi-axis robot to move an end effector of the multi-axis robot into contact with the workpiece and to machine the workpiece; during the machining of the workpiece, measuring, by one or more sensors located on the multi-axis robot, one or more parameters of the multi-axis robot; and controlling, by a controller, using sensor measurements of the one or more sensors, a damping system coupled to the multi-axis robot, thereby to control a resistive force applied to the multi-axis robot by the damping system so as to actively damp vibration of the end effector during the machining of the workpiece.

DETAILED DESCRIPTION

Figure 2:
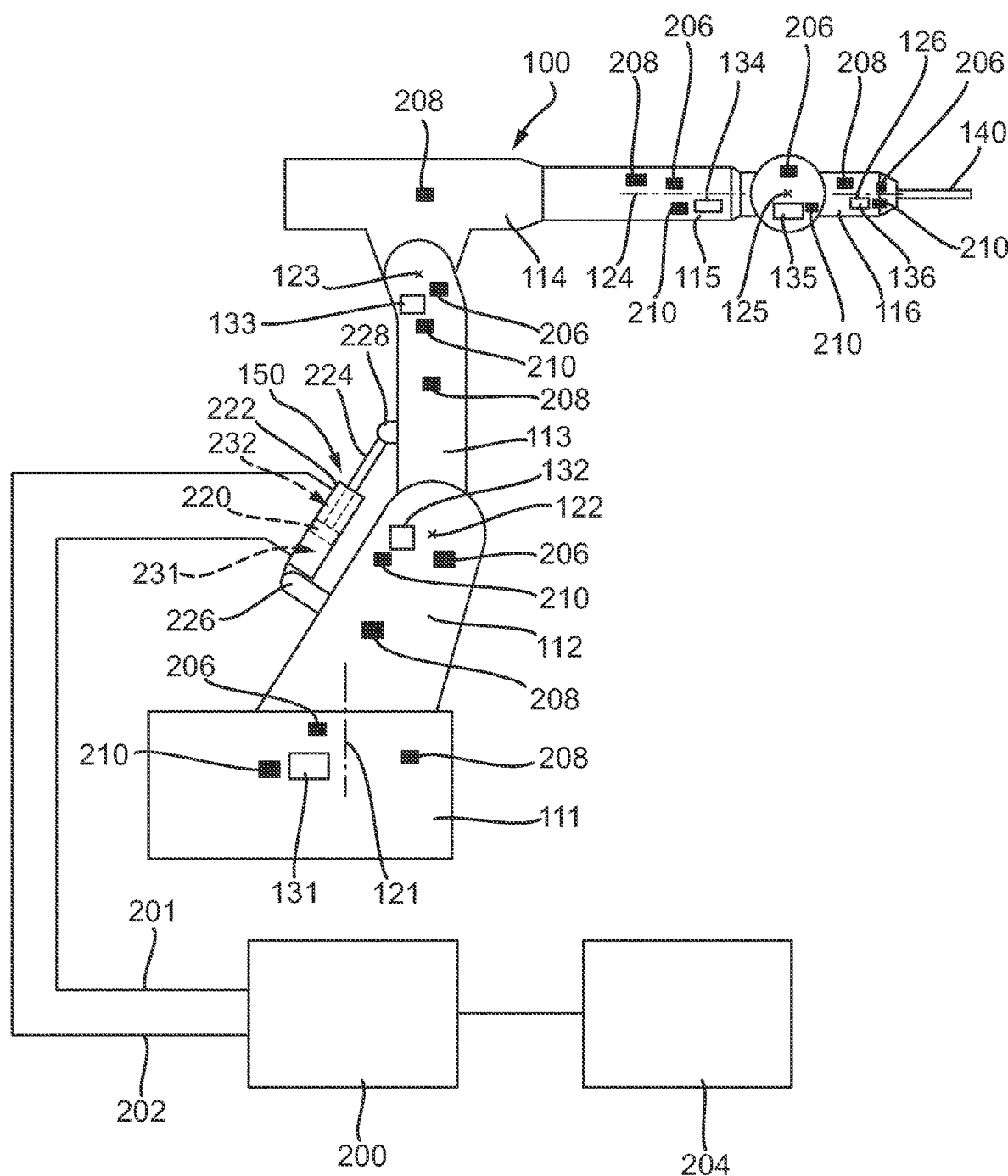
FIG. 2 is a schematic illustration (not to scale) of a robot comprising an active damping system.

FIG. 2 is a schematic illustration (not to scale) of an embodiment of a robotic system comprising the multi-axis robot 100 and an active damping system. The system may be for use in the manufacture of aerospace components such as aluminium or titanium complex thin-wall aerospace components.

Figure 1:
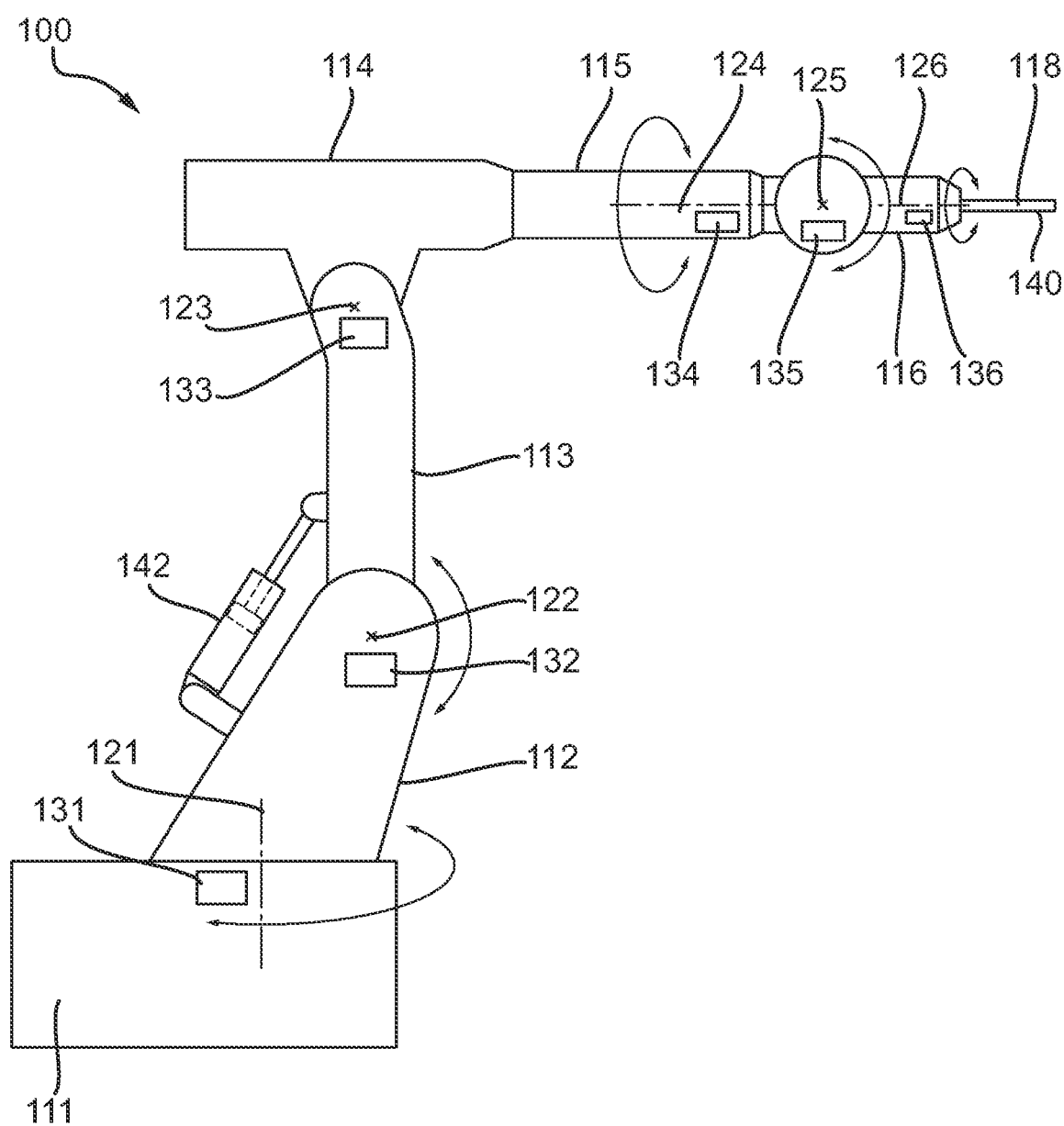
FIG. 1 is a schematic illustration (not to scale) showing a conventional manufacturing robot.

The robot 100 of the system is substantially the same as that shown in FIG. 1 and described in more detail earlier above, and elements which are substantially the same as those of FIG. 1 bear identical reference numerals thereto and descriptions thereof will be omitted.

In this embodiment, the active damping system for the robot 100 comprises a damper 150, a fluid pump 200, a first fluid line 201, a second fluid line 202, a controller 204, a plurality of vibration sensors 206, a plurality of strain gauges 208, and a plurality of temperature sensors 210.

In this embodiment, the damper 150 is coupled between the second and third portions 112, 113. The damper 150, which may be a hydraulic damper or gas spring, comprises a piston 220 operating within a cylinder 222 containing a pressurized fluid, i.e. a liquid or gas. The piston 220 is slidably mounted within the cylinder 222. A piston rod 224 is rigidly fixed to the piston 220, and extends through a bore at a first end of the cylinder 222. The damper 150 may comprise a seal mounted within the bore at the first end of the cylinder 222 which cooperates with the piston rod 224 to prevent escape of fluid from the cylinder 222. In this embodiment, the second portion 112 is attached to the cylinder 222 of the damper 150, via a first coupling mechanism 226, at or proximate to a second end of the cylinder 222, which is opposite to the first end. Also, the third portion 113 is attached to the end of the piston rod 224 that extends from the cylinder, via a second coupling mechanism 228.

The pump 200 is coupled to the damper 150 via the first and second fluid lines 201, 202 such that the pump 200 may pump fluid (e.g. a hydraulic fluid or a pressurised gas such as nitrogen) to or from the cylinder 222 of the damper 150 via the first and second fluid lines 201, 202. More specifically, the pump 200 is coupled to the cylinder 222 of the damper 150 at a first side of the piston 220 by the first fluid line 201 such that, in operation, the pump 200 may pump fluid into or out of a first chamber 231 within the cylinder 222 of the damper 150, the first chamber 231 being located at the first side of the piston 220. Also, the pump 200 is coupled to the cylinder 222 of the damper 150 at a second side of the piston 220 (which is opposite to the first side of the piston 220) by the second fluid line 202 such that, in operation, the pump 200 may pump fluid into or out of a second chamber 232 within the cylinder 222 of the damper 150, the second chamber 232 being located at the second side of the piston 220. The pump 200 is coupled to and controlled by the controller 204.

The damper 150 is configured to exert a force on the robot 100, thereby to resist movement of the robot 100. The magnitude of the resistive force applied to the robot 100 by the damper 150 is dependent on the fluid pressures in the first and second chambers of the damper 150.

Each vibration sensor 206 is mounted at a different respective location on the robot 100. Preferably, the vibration sensors 206 are located at or proximate to the axes 121-126 of the robot 100. For example, the vibration sensors 206 may be located within a predefined threshold distance from the axes 121-126, e.g. within 1 cm, with 2 cm, with 3 cm, with 4 cm, within 5 cm, or within 10 cm. The vibration sensors 206 are configured to measure local vibration of the robot 100. The vibration sensors 206 are coupled to the controller 204 such that vibration measurements taken by the vibration sensors 206 are sent to the controller 204.

Each strain gauge 208 is mounted at a different respective location on the robot 100. Preferably, the strain gauges 208 are located on the structural portions 111-116 of the robot 100, remote or spaced apart from the axes 121-126. In some embodiments, one or more strain gauges 208 are located on the robot 100 at a maximum distance from one or more of the axes 121-126. In some embodiments, a strain gauge 208 is located on a structural portion substantially equidistant from the axes located at opposite ends of that structural portion. For example, the third structural portion 113 has second and third axes 122, 123 located at opposite ends of that structural portion 113, and a strain gauge 208 may be located on the third structural portion 113 substantially equidistant from both the second and third axes 122, 123. The strain gauges 208 are configured to measure local strains in the robot 100, which may be indicative of deflection of the portions 111-116 of the robot 100. The strain gauges 208 are coupled to the controller 204 such that strain measurements taken by the strain gauges 208 are sent to the controller 204.

Each temperature sensor 210 is mounted at a different respective location on the robot 100. Preferably, the temperature sensors 210 are located at or proximate to the motors 131-136. For example, the temperature sensors 210 may be located within a predefined threshold distance from the motors 131-136, e.g. within 1 cm, with 2 cm, with 3 cm, with 4 cm, within 5 cm, or within 10 cm. The temperature sensors 210 are configured to measure temperatures of different parts of the robot 100, e.g. of the motors 131-136 of the robot 100. The temperature sensors 210 are coupled to the controller 204 such that temperature measurements taken by the temperature sensors 210 are sent to the controller 204.

The controller 204 is configured to receive sensor measurements from the plurality of vibration sensors 206, the plurality of strain gauges 208, and the plurality of temperature sensors 210. The sensor measurements are the controller's input variables. The controller 204 is further configured to process the received sensors measurements to determine an amount and/or a pressure of fluid that is to be contained within the first and second chambers 231, 232 of the cylinder 222 of the damper 150, e.g. in order to damp or react against unwanted movement of the robot 100 (such as vibrational motion and/or deflection currently being experienced by the robot 100). In some embodiments, the controller 204 may be configured to, instead of or in addition to determining an amount and/or a pressure of fluid that is to be contained within the first and second chambers 231, 232, process the received sensors measurements to determine a pressure differential between the first and second chambers 231, 232. The controller 204 is further configured to control the pump 200 to pump fluid (e.g. a hydraulic liquid, or a gas) into/out of the first and second chambers 231, 232 of the cylinder 222 of the damper 150 such that the chambers 231, 232 contain the amount or pressure of fluid determined by the controller 204, and/or such that the determined pressure differential is realised.

For example, in some embodiments, the controller 204 determines, based on one or more of the received sensor measurements, a resistive force to apply to the robot 100 to damp the vibrations and deflections being experienced by the robot 100 (which may be being caused by dynamic machining forces). The controller 204 may also determine fluid pressures in the first and second chambers 231, 232 of the cylinder 222 and/or a pressure differential therebetween that would result in the determined resistive force being applied to the robot 100. The controller 204 then controls the pump 200 to pump fluid to/from the first and/or second chambers 231, 232, thereby to realise the determined pressures or pressure differential. Thus, the damper 150 is adapted to apply the determined resistive force to the robot 100, thereby to damp the vibrations and deflections being experienced by the robot 100.

In this embodiment, the controller 204 uses measurements from the plurality of vibration sensors 206, the plurality of strain gauges 208, and the plurality of temperature sensors 210 to actively damp the robot 100. In some embodiments, the processing of the sensor measurements by the controller 204 may comprise weighting measurements from different types of sensor differently. For example, strain measurements and/or low frequency vibration measurements may be given a higher weighting compared to temperature measurements and/or high frequency vibration measurements. In some embodiments, the processing of the sensor measurements by the controller 204 may comprise weighting measurements taken at different locations on the robot 100 differently.

The controller 204 may be configured to increase the resistance of the damper 150 if the vibration sensors 206 indicate an increase in vibration of the robot 100 during use, e.g. if the vibration sensors 206 indicate vibration above a threshold level. Similarly, the controller 204 may be configured to decrease the resistance of the damper 150 if the vibration sensors 206 indicate low levels of vibration of the robot 100 during use, e.g. if the vibration sensors 206 indicate vibration below a threshold level. This tends to ensure compliance with robot path motion and reduce or eliminate the likelihood of the motors 131-136 being overloaded or fighting the damper 150.

The controller 204 may be configured to increase the resistance of the damper 150 if the strain gauges 208 indicate an increase in deflection of the robot 100 during use, e.g. if the strain gauges 208 indicate bending above a threshold level. Similarly, the controller 204 may be configured to decrease the resistance of the damper 150 if the strain gauges 208 indicate low levels of deflection of the robot 100 during use, e.g. if the strain gauges 208 indicate bending below a threshold level. Resistance may also be controlled to support the mass of the robot.

The controller 204 may be configured to increase the resistance of the damper 150 if the temperature sensors 210 indicate that the motors 131-136 are operating below a threshold temperature. Similarly, the controller 204 may be configured to decrease the resistance of the damper 150 if the temperature sensors 210 indicate that the motors 131-136 are operating above a threshold temperature. This tends to ensure compliance with robot path motion and reduce or eliminate the likelihood of the motors 131-136 being overloaded or fighting the damper 150.

Thus, the controller 204 is particularly configured to control the active damper 150 so that the undesirable operation and unwanted movement of the robot 100, such as excessive vibration and/or deflection, is reduced (and more preferably minimized). The controller 204 may be, for example, a PID-controller, a PD controller, or a PI-controller.

The above described active damping system for the robot advantageously tends to allow for the application of variable damping and resistance to the robot. The damping system of the robot tends to be tuneable to the load being handled by the robot. This load may result from the action of machining. This tunability tends to enable undesirable influences to component accuracy and surface finish to be reduced or eliminated.

The active damping system may advantageously react to changes, both in magnitude and direction, of the machining forces experienced by the robot during use.

Advantageously, the above described active damping system for the robot advantageously tends to improve contact between the end effector/machining tool of the robot and the workpiece during the machining of that workpiece. This advantageously tends to provide improved surface finish and machining accuracy. Also, this tends to improve machining efficiency by allowing for a greater depth of cut to be accurately made through greater system rigidity.

Apparatus, including the controller 204, for implementing the above arrangement may be provided by configuring or adapting any suitable apparatus, for example one or more computers or other processing apparatus or processors, and/or providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM etc., or any combination of these or other storage media.

In the above embodiments, the robot is a six-axis robot. However, in other embodiments the robot has a different number of rotary axes about which it may be controlled to move. The robot may also include a different number of motors, i.e. other than six motors, for moving the robot. Also, in some embodiments, the robot may include one or more linear axes along which the robot may be moved. For example, the robot may be mounted to a rail or track along which it may be slid.

In the above embodiments, the damper is a hydraulic damper or gas spring. However, in other embodiments, the damper is a different type of damper, for example an electrical actuator (e.g. an electrical linear actuator).

In the above embodiments, the robot comprises a single active damper. However, in other embodiments, the robot comprises a plurality of active dampers. In some embodiments, the robot further comprises one or more passive dampers in addition to the one or more active dampers.

In the above embodiments, the damper is attached between the second and third portions of the robot. However, in other embodiments, one or more dampers is attached between a different pair of arm portions instead of or in addition to being attached between the second and third portions of the robot. For example, an active damper may be attached between the first and second portions, between the third and fourth portions, between the first and third portions, or between any other pair of portions.

In the above embodiments, the damper attaches together two portions. However, in other embodiments, a damper attaches together a different number of portions, for example three portions.

In the above embodiments, as shown in FIG. 2, the robot comprises six vibration sensors. However, in other embodiments, the robot comprises a different number of vibration sensors, for example more than six vibration sensors.

In the above embodiments, as shown in FIG. 2, the robot comprises six strain gauges. However, in other embodiments, the robot comprises a different number of strain gauges, for example more than six strain gauges.

In the above embodiments, as shown in FIG. 2, the robot comprises six temperature sensors. However, in other embodiments, the robot comprises a different number of temperature sensors, for example more than six temperature sensors.

In the above embodiments, the robot comprises a plurality of vibration sensors, strain gauges, and temperature sensors. However, in other embodiments, one or more of the sensors is omitted. For example, in some embodiments, one or more (e.g. all) of the temperature sensors is omitted, and the controller controls the resistance applied by the damper using some or all of the measurements taken by the vibration sensors and the strain gauges only.

In some embodiments, the robot comprises one or more different types of sensor instead of or in addition to one or more of the vibration sensors, the strain gauges, and the temperature sensors. The controller may use measurements taken by the one or more of the different types of sensor to control the active damper. For example, the robot may include a pressure sensor configured to measure pressure of the fluid in the first chamber of the damper, a pressure sensor configured to measure pressure of the fluid in the second chamber of the damper, a pressure sensor configured to measure pressure of the fluid in the first fluid line, a pressure sensor configured to measure pressure of the fluid in the second fluid line, a flow rate sensor configured to measure a flow rate of the fluid in the first fluid line, and/or a flow rate sensor configured to measure a flow rate of the fluid in the second fluid line. The controller may control the active damper based on measurements taken by one or more of the pressure and flow rate sensors.

In some embodiments, the controller controls the active damper based on one or more different measurements instead of or in addition to those mentioned earlier above. For example, in some embodiments, the controller controls the active damper based on an amp draw of one or more of the motors.

In some embodiments, the controller may use measurements taken by one or more of the vibration sensors, one or more of the strain gauges, and/or one or more of the temperature sensors to control the motors.

The invention claimed is:

1. A robotic system comprising:
a multi-axis robot arm, the robot arm comprising a plurality of arm portions rotatably connected together, the robot arm configured to be rotated about a plurality of rotary axes;
one or more sensors located on the robot arm;
a damping system configured to apply a resistive force to the robot arm, thereby to resist movement of the robot arm; and
a controller coupled to the one or more sensors and the damping system, the controller being configured to:
receive sensor measurements from the one or more sensors; and
control, based on the received sensor measurements, the damping system thereby to control the resistive force applied by the damping system to the robot arm, wherein
the one or more sensors comprise one or more sensors selected from the group of sensors consisting of:
a vibration sensor located on the robot arm at or proximate to a rotary axis of the robot arm;
a strain gauge located on an arm portion remote from the rotary axes; and
a temperature sensor located on the robot arm at or proximate to a motor of the robot arm, the motor being configured to move the robot arm, and
wherein the one or more sensors comprise all of the vibration sensor, the strain gauge, and the temperature sensor.

2. The robotic system of claim 1, wherein the one or more sensors comprise a plurality of vibration sensors and, for each rotary axis of the robot arm, one or more of the vibration sensors are located on the robot arm at or proximate to that rotary axis.

3. The robotic system of claim 1, wherein the one or more sensors comprise a plurality of strain gauges and, for each arm portion, one or more of the strain gauges are located on that arm portion remotely from the axes of the robot arm.

4. The robotic system of claim 1, wherein the robotic system further comprises a plurality of motors operable to move the robot arm, the one or more sensors comprise a plurality of temperature sensors, and, for each motor, one or more of the temperature sensors are located at or proximate that motor.

5. The robotic system of claim 1, wherein the damping system comprises a hydraulic damper or gas spring.

6. The robotic system of claim 1, further comprising a pump for pumping a fluid to the damping system, wherein the controller is configured to control, based on the received sensor measurements, the pump to pump the fluid to the damping system thereby to vary the resistive force applied by the damping system to the robot arm.

7. The robotic system of claim 6, wherein the one or more sensors further comprises one or more sensors selected from the group consisting of:
- a first pressure sensor configured to measure a pressure of the fluid in a chamber of the damping system;
- a second pressure sensor configured to measure a pressure of the fluid in a fluid line of the damping system; and
- a flow rate sensor configured to measure a flow rate of the fluid in a fluid line of the damping system.

8. The robotic system of claim 1, wherein the robotic system comprises one or more motors operable to move the robot arm and the controller is configured to control, based on the received sensor measurements, operation of the one or more motors.

9. The robotic system of claim 1, further comprising an end effector connected to the robot arm, the end effector comprising a cutting tool.

10. The robotic system of claim 9, wherein the controller is configured to control the damping system to actively damp vibration of the end effector.

11. The robotic system of claim 1, wherein the one or more sensors further comprise one or more sensors for measuring amp draw of a motor of the robot arm, the motor being configured to move the robot arm.

12. A method of damping a multi-axis robot arm, the robot arm comprising a plurality of arm portions rotatably connected together, the robot arm configured to be rotated about a plurality of rotary axes, the method comprising:
- measuring, by one or more sensors, one or more parameters of the robot arm; and
- controlling, by a controller, based on sensor measurements taken by the one or more sensors, a damping system coupled to the robot arm thereby to control a resistive force applied to the robot arm by the damping system, wherein
- the one or more sensors comprise one or more sensors selected from the group of sensors consisting of:
- a vibration sensor located on the robot arm at or proximate to a rotary axis of the robot arm, the vibration sensor measuring a vibration of the robot arm;
- a strain gauge located on an arm portion remote from the rotary axes, the strain gauge measuring a strain in that arm portion; and
- a temperature sensor located on the robot arm at or proximate to a motor of the robot arm, the motor being configured to move the robot arm, the temperature sensor measuring a temperature at or proximate to the motor, and
- wherein the one or more sensors comprise all of the vibration sensor, the strain gauge, and the temperature sensor.

13. The method of claim 12, wherein the controlling comprises:
- determining, by the controller, based on the sensor measurements, a resistive force to be applied to the robot arm by the damping system; and
- controlling, by the controller, the damping system to apply the determined resistive force to the robot arm.

14. A method of machining a workpiece to produce an aerospace component, the method comprising:
- controlling a multi-axis robot arm to move an end effector of the robot into contact with the workpiece and to machine the workpiece, the robot arm comprising a plurality of arm portions rotatably connected together, the robot arm configured to be rotated about a plurality of rotary axes;
- during the machining of the workpiece, measuring, by one or more sensors, one or more parameters of the robot arm; and
- controlling, by a controller, using sensor measurements of the one or more sensors, a damping system coupled to the robot arm, thereby to control a resistive force applied to the robot arm by the damping system so as to actively damp vibration of the end effector during the machining of the workpiece,
- wherein the one or more sensors comprise one or more sensors selected from the group of sensors consisting of:
- a vibration sensor located on the robot arm at or proximate to a rotary axis of the robot arm, the vibration sensor measuring a vibration of the robot arm;
- a strain gauge located on an arm portion remote from the rotary axes, the strain gauge measuring a strain in that arm portion; and
- temperature sensors located on the robot arm at or proximate to a motor of the robot arm, the motor being configured to move the robot arm, the temperature sensor measuring a temperature at or proximate to the motor, and
- wherein the robot further comprises a plurality of motors operable to move the robot arm, the one or more sensors comprise a plurality of temperature sensors, and, for each motor, one or more of the temperature sensors are located at or proximate that motor.

15. A robotic system comprising:
- a multi-axis robot arm, the robot arm comprising a plurality of arm portions rotatably connected together, the robot arm configured to be rotated about a plurality of rotary axes;
- a plurality of motors operable to move the robot arm;
- one or more sensors located on the robot arm;
- a damping system configured to apply a resistive force to the robot arm, thereby to resist movement of the robot arm; and
- a controller coupled to the one or more sensors and the damping system, the controller being configured to:
- receive sensor measurements from the one or more sensors; and
- control, based on the received sensor measurements, the damping system thereby to control the resistive force applied by the damping system to the robot arm,
- wherein the one or more sensors comprise one or more sensors selected from the group of sensors consisting of:
- a vibration sensor located on the robot arm at or proximate to a rotary axis of the robot arm;
- a strain gauge located on an arm portion remote from the rotary axes; and
- a temperature sensor located on the robot arm at or proximate to a motor of the robot arm, the motor being configured to move the robot arm,
- wherein the robotic system further comprises a plurality of motors operable to move the robot arm, the one or more sensors comprise a plurality of temperature sensors, and, for each motor, one or more of the temperature sensors are located at or proximate that motor.

* * * * *